Figure 1:
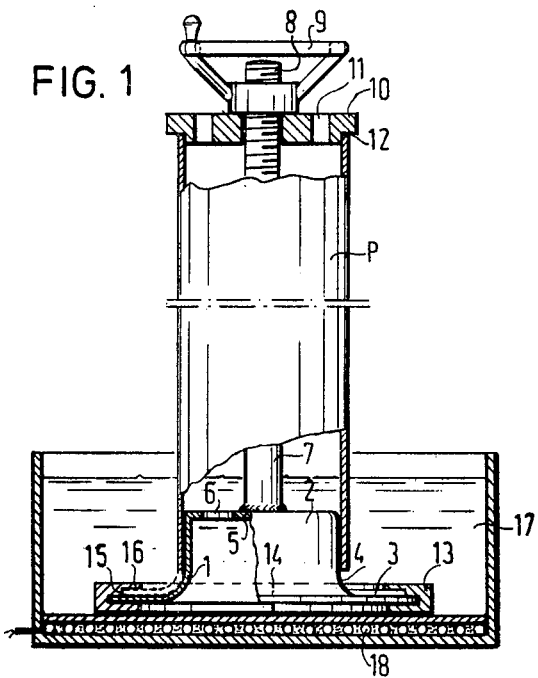

United States Patent [19]

Klasema et al.

[11] 4,269,801
[45] May 26, 1981

[54] METHOD AND DEVICE FOR FORMING A FLANGE ON A TUBULAR ELEMENT OF A SYNTHETIC RESIN

[75] Inventors: Hendrik Klasema, Bergen op Zoom, Netherlands; Hendrikus A. Prince, Kometenlaan 29, Bergen op Zoom, Netherlands

[73] Assignee: Hendrikus Andreas Prince, Bergen op Zoom, Netherlands

[21] Appl. No.: 887,308

[22] Filed: Mar. 16, 1978

[30] Foreign Application Priority Data

Mar. 16, 1977 [NL] Netherlands ..................... 7702866

[51] Int. Cl.³ .............................................. B29C 17/00
[52] U.S. Cl. ................................... 264/156; 264/296; 264/322; 425/384; 425/393
[58] Field of Search ....................... 264/296, 322, 156; 425/384, 393

[56] References Cited

U.S. PATENT DOCUMENTS 3,435,109  3/1969  Flaming ............................. 264/296
3,966,384  6/1976  Maier ................................ 264/322

Primary Examiner—James H. Derrington
Attorney, Agent, or Firm—John P. Snyder

[57] ABSTRACT

A method and a device for forming a flange at the end of a tubular, thin-walled element of a synthetic resin, said method comprising the steps arranging the element on a cylindrical moulding body having a gradually flaring, radial guide surface, introducing the end slipped onto the moulding body into a space containing a heating medium in order to heat the synthetic resin up to the softening point, producing an axial pressure between the element and the moulding body in order to shift the wall of the element over a given length along the guide surface, introducing the moulding body with the element into a space containing a cooling medium and finally by separating the mould from the moulded element, said device is principally distinguished in that the moulding body is provided with a cylindrical guide surface and a radially extending guide surface, between which surfaces a gradual junction is formed.

7 Claims, 2 Drawing Figures

U.S. Patent  May 26, 1981  4,269,801

METHOD AND DEVICE FOR FORMING A FLANGE ON A TUBULAR ELEMENT OF A SYNTHETIC RESIN

The invention relates to a method and a device for forming a flange at the end of a tubular, thin-walled element of a synthetic resin.

It is known to provide a tubular element with a flange during the spray-casting process. Such a method has the disadvantage that the spray-casting mould is expensive. A comparable method is based on an existing tubular element, the end of which is softened and pressed in a mould so that the desired flange is obtained. Also this method requires much time, since the synthetic resin has to be softened to a high extent, whilst the mould is expensive because the mould cavity has to be accurately machined.

The invention has for its object to shorten the method to an appreciable extent and to provide a particularly simple construction of the device required thereto.

The method according to the invention is distinguished by arranging the element on a cylindrical moulding body having a gradually flaring, radial guide surface, by introducing the end slipped onto the moulding body into a space containing a heating medium in order to heat the synthetic resin up to the softening point, by producing an axial pressure between the element and the moulding body in order to shift the wall of the element over a given length along the guide surface, by introducing the moulding body with the element into a space containing a cooling medium and finally by separating the mould from the moulded element.

The invention proposes furthermore to use a fluid both for heating medium as for a cooling medium. This is conducive to the heat transfer to both the synthetic resin element and the moulding body. Moreover the temperature for the softening point can be accurately regulated, which is particularly important for said method.

The device for carrying out the aforesaid method according to the invention is distinguished in that the moulding body is provided with a cylindrical guide surface and a radially extending guide surface, between which surfaces a gradual junction is formed.

In a preferred embodiment the moulding body has a thin wall, which enables rapid temperature changes so that the deformation of the tubular element of synthetic resin can be accurately controlled.

The invention furthermore proposes to arrange an annular element serving as a stop around the free circumferential boundary of the radially extending guide surface. By this stop the outer boundary of the flange to be formed is accurately defined.

In a preferred embodiment the annular element has a rim extending at a given distance from and parallel to the radially extending guide surface and joining the annular stop element, the dimensions being such that when the flange is formed at the synthetic resin element the outer edge of the flange is pressed between the rim of the annular element and the guide surface of the moulding body, which improves the resistance to deformation of the flange. In a further embodiment the annular element is provided with a surface coaxial with the cylindrical guide surface of the moulding body, the distance between said two surfaces being at the most equal to the thickness of the tubing to be formed. This device permits not only of making thin flanges of the thickness of the basic tubing but also of making thickened flanges which are required for given purposes. Owing to the required space between the two surfaces the material of the tubing that has not yet been softened may serve as a pressing means for the softened end of the tubing so that the required material for the thickened flange can be subjected to pressure in a simple manner. According to a further aspect conical tie surfaces are formed between the cylindrical surfaces and the radial surfaces of the moulding body and the annular element respectively. These conical surfaces serve to improve the flow of plasticized material towards the final flange cavity. The surfaces preferably diverge from one another.

Figure 2:
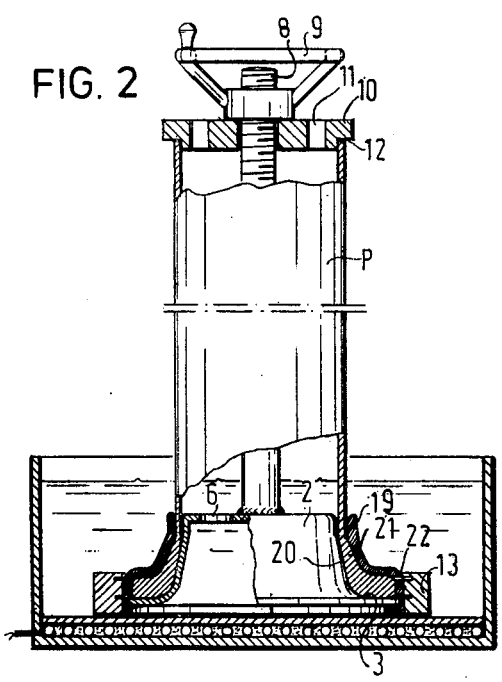

The invention will be described more fully with reference to two embodiments. In the drawing FIG. 1 is a longitudinal sectional view of a first embodiment suitable for obtaining thin flanges, FIG. 2 is a longitudinal sectional view like FIG. 1 of a second embodiment for obtaining thick flanges.

Referring to the drawing, reference numeral 1 designates a moulding body. This moulding body 1 has a cylindrical guide surface 2 and a radially extending guide surface 3 joining the former, a gradual junction being formed between said two surfaces. On the top side of the cylindrical portion of the moulding body 1 a wall 5 is provided in which apertures 6 are provided. From the Figure it will be apparent that the moulding body 1 has a thin wall.

Centrally of the wall 5 is arranged a standing shaft 7 having screwthread 8 near the end remote from the moulding body 1. Onto this screwthread 8 can be screwed a handwheel 9, which bears on a pressure plate 10 also having apertures 11. On the side remote from the handwheel 9 the pressure plate 10 has a fitting rim 12.

Around the free circumference of the radially extending guide surface 3 is arranged an annular element 13, which consists in the embodiment shown of two half rings closing together at the joint 14. The annular element 13 serves as a stop for the outer edge of the flange to be formed, which will be explained more fully hereinafter, the stop being formed by the surface 15. At a given distance from the annular guide surface 3 and parallel thereto an annular guide member 16 joins the surface 15 and is integral with the annular element 13.

The device operates as follows.

A tubular, thinwalled element P is slipped by one end onto the cylindrical portion 2 of the moulding body 1 as illustrated in the Figure. Subsequently the pressure plate 10 is arranged at the other end, the centering rim 12 fitting in the tubular element P. Then the handwheel 9 is screwed onto the screw spindle 8 until the element P is jammed at the transition 4 of the moulding body.

The annular element 13 is mounted and the whole assembly is introduced in a space containing a heating fluid, which space is represented in the Figure by a holder 17 containing a fluid heated by a heating filament 18 to the desired temperature. After some time the softening point of the synthetic resin of the tubular element P is attained, after which directly an axial pressure is produced between the element P and the moulding body 1 by tightening the handwheel 9 on the screw spindle 8. As a result the softened end of the element P is slid along the guide surface 2, the gradual junction 4 up to the radially extending surface 3 until the free end abuts against the surface 15 of the annular element 13. The guide rim 16 ensures that the flange P' thus formed, on the left-hand side of the Figure, is retained.

As soon as the flange comes into contact with the surface 15 of the annular element 13 the device is taken out of the holder 17 and put into an identical holder containing, however, a cooling medium. By such "quenching" the shape of the flange is fixed with respect to the element P and by loosening the annular element 13 by disengaging the two parts the product P' can be removed from the device and the moulding body by unscrewing the handwheel 9 from the spindle 7.

From the Figure it will be seen that the moulding body 1 is a particularly simple tool, whilst the dimensions of the moulding body 1 are determined in dependence upon the tubular element P to be handled. Furthermore only the plate 10 has to be matched, whilst all further elements can be maintained. FIG. 2 shows a device for making tubings with thick flanges. The same parts of the device are designated by the same reference numerals.

The annular element 13 in this embodiment has a guide surface 19 coaxial with the guide surface 2, the distance between said two surfaces being such that it is at the most equal to the thickness of the tubing P to be treated. A conical tie surface 20 is provided between the radial guide surface 3 and the guide surface 2 and the annular element 13 has a conical inner surface 21. From the Figure it will be apparent that the two surfaces diverge in the direction towards the radial surface 3. The moulding space now closed has small outlet apertures 22 in order to expell the enclosed air or the heating fluid during the moulding of a flange.

The device operates like the device described with reference to FIG. 1, the difference being that the material in the gap between the cylindrical surfaces of the moulding body and the annular element should still have such a rigidity that it can serve as a pressing plunger for subjecting the already softened material in the moulding space to pressure.

As a matter of course, the invention is not limited to the the embodiments shown, neither to the tubular element. The axial pressure produced between the tubular element and the moulding body 1 may, for example, be obtained in a different manner than by mechanical agency.

The tubular element P may have another shape than the cylindrical one, it may, for example, be formed by tubular studs of synthetic resin casings or vessels or three-way pieces which are commercially available.

The moulded product, the tubular element with a radially extending flange may be used as an auxiliary piece in any conduit system. The flange may be provided with holes for fastening means, which may be drilled afterwards. Moreover, the flange may be clamped tight between sliding flanges, the flanges themselves serving as stuffing material, though additional stuffing material may be arranged between them. Suitable adhesives may also be interposed.

What is claimed is:

1. The method of producing a flange at one end of a tubular element of thermoplastic synthetic resinous material which comprises the steps of:
    (a) providing a cylindrical molding body having a gradually radially flaring guide surface at one end thereof;
    (b) securing a split, annular element to said one end of the molding body to provide at least an upstanding annular stop surface concentric with the molding body;
    (c) sliding the tubular element onto said molding body;
    (d) heating the molding body and at least that portion of the tubular element surrounding said molding body until the softening point temperature of said synthetic resinous material is reached and then forcing said tubular element axially of said molding body to form a flange which engages said stop surface;
    (e) cooling said molding body and the flange end of the tubular element below said softening point temperature; and then
    (f) splitting and removing said annular element to release the finished article.

2. The method as defined in claim 1 wherein step (d) is effected by immersing the molding body and said portion of the tubular element in a heated liquid.

3. The method as defined in claim 2 wherein step (e) is effected by immersing said molding body and the flared end of the tubular element in a cooled liquid.

4. The method as defined in claim 1 wherein said annular element includes a portion surrounding said cylindrical body and defining a cavity therewith in which the cavity exceeds the wall thickness of said tubular element and wherein, in step (d), the tubular element is forced axially until the flange thickens and fills said cavity.

5. The method as defined in claim 4 wherein step (d) is effected by immersing the molding body and said portion of the tubular element in a heated liquid.

6. The method as defined in claim 5 wherein step (e) is effected by immersing said molding body and the flared end of the tubular element in a cooled liquid.

7. The method as defined in claim 1 including a further step wherein holes are formed in the flange for passing fastening members.

* * * * *